United States Patent
Roberts

(10) Patent No.: US 10,044,679 B2
(45) Date of Patent: Aug. 7, 2018

(54) SYSTEM AND METHOD FOR PROXY-BASED PRIVACY PROTECTION

(71) Applicant: Palo Alto Research Center Incorporated, Palo Alto, CA (US)

(72) Inventor: Michael Roberts, Los Gatos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 15/069,755

(22) Filed: Mar. 14, 2016

(65) Prior Publication Data

US 2017/0264591 A1 Sep. 14, 2017

(51) Int. Cl.
*H04L 9/00* (2006.01)
*H04L 29/06* (2006.01)
*G06F 9/50* (2006.01)
*G06F 21/62* (2013.01)
*G06Q 30/02* (2012.01)
(Continued)

(52) U.S. Cl.
CPC .......... *H04L 63/0281* (2013.01); *G06F 9/505* (2013.01); *G06F 17/3089* (2013.01); *G06F 21/6263* (2013.01); *G06Q 30/0277* (2013.01); *H04L 63/0407* (2013.01); *G06F 17/30861* (2013.01); *G06F 21/6245* (2013.01); *H04L 63/0245* (2013.01); *H04L 63/0442* (2013.01); *H04L 63/102* (2013.01); *H04L 67/02* (2013.01);
(Continued)

(58) Field of Classification Search
None
See application file for complete search history.

(56) References Cited

U.S. PATENT DOCUMENTS

2002/0062357 A1\* 5/2002 Srinivasan .......... H04L 63/0428
709/219
2006/0020660 A1\* 1/2006 Prasad .............. G06F 17/30902
709/203
(Continued)

FOREIGN PATENT DOCUMENTS

WO 20130079113 6/2013

OTHER PUBLICATIONS

AdBlock, URL <https://getadblock.com> (Web page cached on Jan 25, 2014).
(Continued)

*Primary Examiner* — Alexander Lagor
(74) *Attorney, Agent, or Firm* — Patrick J.S. Inouye; Leonid Kisselev

(57) ABSTRACT

User privacy while browsing the Internet can be preserved by reversing the man-in-the-middle attack using a distributed network of proxy servers. The proxy servers receive user requests to load webpages of interest to a user and simulate the user's web-browsing activity by retrieving the target webpage from a target server. The proxy servers remove elements that could be used to track the user from the retrieved webpages by creating a representation of a version of the page without the tracking elements, which is provided to the user. By interacting with the target servers, the proxy servers protect the user from being tracked by the target servers. Further, by observing the user's browsing activity, the proxy servers can build a profile of the users that can be used to supplement content provided to user. The user can edit the profile and thus can control the information stored on the network.

18 Claims, 4 Drawing Sheets

(51) Int. Cl.
  *G06F 17/30* (2006.01)
  *H04L 29/08* (2006.01)
(52) U.S. Cl.
  CPC ........ *H04L 67/1002* (2013.01); *H04L 67/306* (2013.01)

(56) References Cited

U.S. PATENT DOCUMENTS

| | | | | |
|---|---|---|---|---|
| 2008/0080698 | A1* | 4/2008 | Williams | H04M 3/42221 379/266.1 |
| 2009/0006974 | A1* | 1/2009 | Harinarayan | G06F 17/30867 715/738 |
| 2009/0144159 | A1* | 6/2009 | Bashyam | G06Q 30/0257 705/14.55 |
| 2009/0187486 | A1 | 7/2009 | Lefenfeld et al. | |
| 2011/0087966 | A1* | 4/2011 | Leviathan | G06F 17/30905 715/745 |
| 2012/0084348 | A1 | 4/2012 | Lee et al. | |
| 2014/0283002 | A1* | 9/2014 | Frechette | H04L 63/0281 726/12 |
| 2016/0050188 | A1* | 2/2016 | Wilson | G06Q 30/0269 713/171 |
| 2016/0086566 | A1* | 3/2016 | Zhu | G09G 5/005 345/428 |

OTHER PUBLICATIONS

Privacy Concerns on Cookies, URL <http://www.allaboutcookies.org/privacy-concerns/> (Web page cached on Sep. 5, 2015).
Man-in-the-middle attack, URL <http://en.wikipedia.org/wiki/Man-in-the-middle_attack> (Web page cached on Feb. 9, 2014).
DuckDuckGo: A New Search Engine Built from Open Source, URL <http://ostatic.com/blog/duckduckgo-a-new-search-engine-built-from-open-source> (Web page cached on Mar. 8, 2016).
HideMyAss VPN Review, URL <http://www.vpncomparison.org/provider/hidemyass/> (Web page cached on Sep. 8, 2015).
Tor: Overview, URL <https://www.torproject.org/about/overview.html.en> (Web page cached on Mar. 9, 2016).
Some Google employees defect, then rebel, URL <http://www.cnn.com/2010/TECH/web/12/24/ex.google.employees/index.html> (Web page cached on Mar. 4, 2016.

* cited by examiner

SYSTEM AND METHOD FOR PROXY-BASED PRIVACY PROTECTION

FIELD

This application relates in general to providing privacy and security during online communications, and in particular, to a system and method for proxy-based privacy protection.

BACKGROUND

Preserving one's privacy while online is a goal that becomes increasingly difficult to achieve as more and more entities try to monitor online activities. For example, Internet advertising service providers, such as Adsense® and DoubleClick® operated by Google®, Inc. of Mountain View, Calif., track visitor activity on webpages that feature advertisements of these service providers. Such tracking is often performed using techniques such as small images or pieces of code that are embedded into a webpage and that interact with a visitor's web browser to obtain information such as the Internet Protocol ("IP") address of the computer receiving the embedded object, the time the object was viewed and for how long, the type of the browser. Additionally, previously set cookie values can provide information regarding the visitor's browsing history. Furthermore, the tracking entity can obtain additional information about the Internet user if the user utilizes services associated with the entity, such as an e-mail service. In addition, the tracked information can be analyzed to discover the user's location and identity.

The tracking entities often pool the data about the user to create a profile of the user, which they use for presenting targeted advertisements to the user. Generally, the user has no way to control the information that the tracking entities have compiled about him or her, and has no part in how this information is stored and protected. Further, in the United States, government regulation of how the user profile is protected is lax, creating a potential for widespread breaches of privacy and exposure of private information such as the user's browsing history, IP address, personal health information, preferences, location, and identity.

Existing technologies do not adequately address the threats to user privacy and security posed by such online tracking. For example, DuckDuckGo.com is an Internet search engine that does not track users performing the search and shows all users the same results for a given search term. While the search is secure, once the user starts accessing the search results, the user's activity can be monitored by tracking entities.

Likewise, HideMyAss!™ is a service that offers a pay-for-use web proxy that allows users to visit webpages without revealing their IP address. However, use of the service interferes with current page personalization code and does not allow targeted advertisements to be shown to users. In addition to depriving users of opportunities to see the advertisements, the service cannot profit on showing the advertisements and must charge users for the opportunity to use the services.

Similarly, the anonymizing service Tor™ (previously an acronym for "The Onion Router") developed of late by the Tor Project Inc. of Walpole, Mass., conceals a user's IP address, location, and Internet activities by routing the user's Internet traffic through multiple nodes. Layered encryption is used at each of the nodes. The use of TOR has several complications. First, the Tor™ service requires an advanced knowledge of the applications being used or a willingness to make a change in the user's Web-browsing habits. For instance, using the Tor™ service requires the user to either configure each online application on his computing device to route traffic through the Tor™ service, or to use the Tor™ service Web-browser. Furthermore, some applications cannot be configured to be used with the Tor™ service, and thus a user may not be able to keep all Internet traffic private. Further, TOR is designed to be resist oversight by state actors, such as government entities, and has previously been used for conducting illegal activities, such as operation of the notorious Silk Road online black market and other dark web illegal websites. A user may be reluctant to utilize Tor™ due to the service's associations with illegal activity.

Finally, browser plug-ins, such as AdBlock™, prevent advertisements from being downloaded when a target webpage is displayed to the user. However, such services interfere with normal interactions of the user's web browser cookies and may negatively affect the user's Internet browsing experience.

Accordingly, there is a need for a way to prevent uncontrolled collection and distribution of private information of an Internet user without negatively affecting the user's web-browsing experience and ability to receive targeted advertising.

SUMMARY

User privacy while browsing the Internet can be preserved by reversing the man-in-the-middle attack using a distributed network of proxy servers. The proxy servers receive user requests to load webpages of interest to a user and simulate the user's web-browsing activity by retrieving the target webpage from a target server. The proxy servers remove elements that could be used to track the user from the retrieved webpages, and create a representation of a reconstructed version of the webpage without the tracking elements. The representation of the reconstructed webpage can be provided to the computing device of the user. By interacting with the target servers, the proxy servers protect the user's computing device from being tracked by the target servers. Further, by observing the user's browsing activity, the proxy servers can build a profile of the users that can be used to supplement content provided to user. The user can edit the profile and thus can control the information stored about him or her on the network and that is used to deliver content such as advertising to the user. Thus, user privacy can be protected even while intimate details about the user are learned to improve the users web-browsing experience.

In one embodiment, a system and method for proxy-based privacy protection is provided. One or more requests from at least one computing device associated with a user to provide a webpage stored on at least one target server are received by a network that includes one or more proxy servers. For each of the requests, the requested webpage is retrieved from the target server by one of the proxy servers. For each of the retrieved webpages, one of the proxy servers parses that webpage into one or more elements, creates a rendering of the webpage based on one or more of the parsed elements, and identifies visual components of the webpage that are present in the rendering. For each of the parsed webpages, one of the proxy servers creates a representation of the parsed webpage reconstructed without one or more of the parsed elements for that webpage using one or more of the components identified in the rendering for that webpage. For each of the reconstructed webpages, one of the proxy servers provides that reconstructed webpage to the computing device, wherein the computing device displays the reconstructed version of the webpage comprising one or more of the visual components using the representation for that webpage.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

One way in which a user's online privacy has commonly been attacked is through a use of the man-in-in-the-middle attack, during which a tracking entity attempts to directly intercept a user's communications with a target entity, such as a server maintaining webpages that the user wants to access. During the attack, a proxy impersonates the target entity with certificates and other identification information, deceiving the user into thinking that the user is communicating with the target entity. The proxy passes traffic from the target entity to the user while collecting the user' private information, such encryption keys, passwords and related information for later use.

Figure 1:
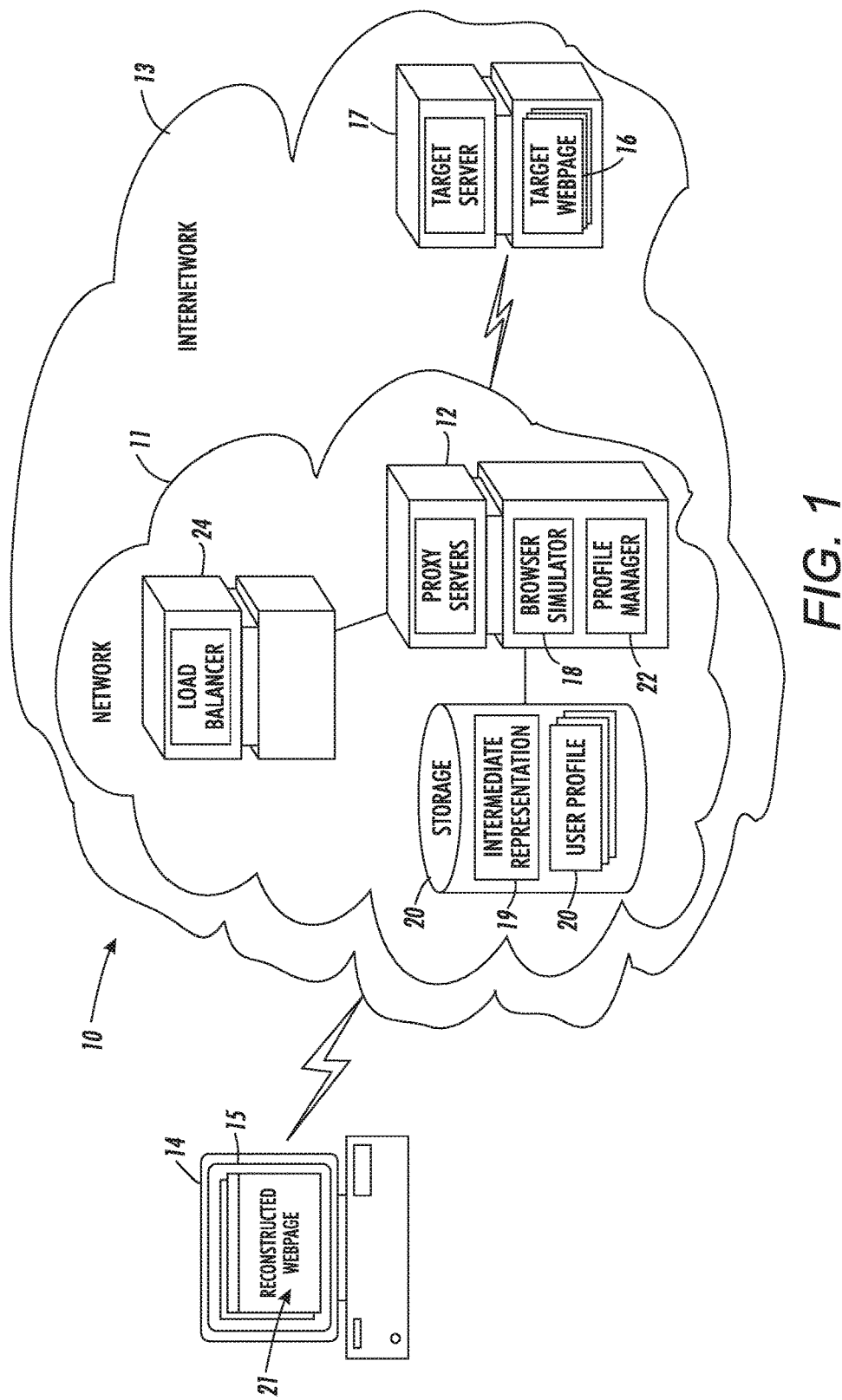
FIG. 1 is a block diagram showing a system for proxy-based privacy protection in accordance with one embodiment.

The man-in-the-middle attack can be reversed to preserve and protect user privacy. FIG. 1 is a block diagram showing a system 10 for proxy-based privacy protection in accordance with one embodiment. The system 10 includes a distributed network 11 of a plurality of proxy servers 12. All of the servers 12 in the network are connected to an Internetwork 13, such as the Internet or a cellular network. The network 11 further includes a load balancer 24, which can be implemented in hardware as a dedicated server or run as software on one of the proxy servers 12 or another computing device.

A computing device 14 associated with an Internet user can interact with the network 11 via the Internetwork 13 and contacts the load balancer 24 with a request to load a particular target webpage 16. The contacting can be done via a plug-in that is a part of the web-browser 15 executing on the computing device 14. Alternatively, the user can configure the browser 15 to point at the load balancer 24. In a further embodiment, instead of pointing at the load browser, the plug-in can point directly at one of the proxy servers 12. The plug-in can randomly select the proxy 12 to which to connect, thus randomizing the entry point. While the computing device 14 is shown as a desktop computer with reference to FIG. 1, other kinds of the computing device 14 are possible, such as a smartphone, a laptop, a tablet, though still other kinds of the computing devices are possible.

The target webpage 16 is stored on the target server 17 as a file that includes computer-executable code, such as HTML code or code in another markup language. In addition to the code that is necessary to render the webpage visual on the browser, the code in the file can also include tracking objects or other dynamic elements that can contact another server and enable user tracking. When the user of the computing device 14 wants to retrieve a particular target webpage 16, instead of directly contacting the server 17 hosting the target webpage 16, as would be conventionally done, the computing device 14 sends a request for the webpage 16 to the load balancer 24, which would assign the request to one of the proxy servers 12 in the distributed network 11. The requests are assigned to the proxy servers 12 randomly, though other ways to assign the requests are possible. Such a request can include a URL of the target webpage 17, though other identifying information is also possible. The request can also include other information, such as the user's log-in information for the webpage.

Each of the proxy servers 12 executes a browsing simulator 18 that receives the request and simulates the activity of the computing device 14 when interacting with the target server 17. In particular, the browser simulator 18 contacts the target server 17 and retrieves the webpage 16 from that server 17. As the proxy server 12 contacting the target server 16 has an IP address that is different from the IP address of the computing device 14, the target server 17 does not learn the IP address of the computing device 14 during the contact. Further, as the computing device 14 uses different for different requests different proxy servers 12 that are chosen at random, the IP address observable by the target servers 17 during fulfillment of different requests also changes, thus preventing the target servers 17 from tying the browsing activity to a particular IP address.

In addition to retrieving the target webpage 17, the browsing simulator would interact with the target server 17 in the same way the computing device 14 normally would. For example, the browsing simulator 18 can receive and store cookies from the target servers 17. Further, the simulator 18 would hit all of the embedded objects in the target webpage, such as tracking objects and other dynamic elements, allowing the target server 17 to track the proxy server 17 while not revealing any information about the user's computing device.

Upon obtaining the target webpage 16 and before providing the webpage 16 to the computing device 14, the browsing simulator 18 "sanitizes" the webpage 16 by stripping away certain undesirable elements, such as elements of the webpage 16 that could be used to track the user or advertisements. In an extreme case, the browsing simulator 18 can render the page to an image, such as a bitmap image, or set of images and transmit these to the client. More generally, the simulator 18 parses the code making up the webpage 16, hitting objects embedded in the webpage like a regular web-browser, and renders the webpage 16. From the rendered webpage 16, the simulator 18 recovers the visual components (components that would be visual to the user of the web-browser 15 if the user accessed the webpage 16 directly through the web-browser 15, such as text and images) of the webpage 16. Based on at least some the visual components, the simulator 18 creates an intermediate visual representation 19 of the webpage 16 reconstructed as to not include the tracking objects or other undesirable content (such as visual components corresponding to undesirable advertisements). When provided to the web-browser 15 by the simulator 18, the rendered representation 19 allows the web-browser 15 to display all components of the webpage 16 that would be visual if the web-browser accessed the webpage 16 directly from the target server 17 (with the exception of any content removed by the simulator 18). As the tracking objects are not included into the representation 19, they cannot track the activity of the user of the activity of the computing device 14 when the web-browser 15 receives the representation.

Such an intermediate representation 19 can include an image of the webpage 16 (without the removed content). Other intermediate representations 19 are possible. For example, the intermediate representations 19 can include a display list for rendering the webpage 16 or display tree. Still other intermediate representations allowing visualizations of the page are possible. The intermediate representations can be stored in the storage 20 or temporarily stored by the servers 12 before being provided to the computing devices 14. The intermediate representation 19 can be a serialized data structure, such as in a JSON format, though other kinds of data structures are possible. Other formats of the intermediate representation are possible. For example, the representation 19 can be an image. Still other formats are possible.

Optionally, the browsing simulator 12 can also create additional visual components be added to the intermediate representations 19, such as advertisements not linked to third party tracking entities, as described further below. The browsing simulator 18 combines the additional visual components and the visual components recovered from the rendered webpage 16 and creates the intermediate representation 19 using the combined content. If no additional elements were obtained by the browsing simulator 18, the browsing simulator 18 would reconstruct the webpage 16 by creating the intermediate representation 19 using only the visual components from the rendering. The browsing simulator 18 serves over the Internetwork the intermediate representation 19 to the computing device 14 associated with the user, with the browser 15 using the intermediate representation 19 to render the sanitized version of the webpage 16 to the user. Thus, the user is presented with desired content without exposing the user to tracking by third party tracking entities.

The proxy servers 12 also execute a profile manager 22 that creates and manages profiles 23 of users based on the requests received from the computing devices 14 associated with these users. The profile manager 22 analyzes the user's traffic, such as the webpages the user visited, the amount of time the user the user spent on the webpages, the links the users click on, and the searches they conduct, to infer user characteristics that form part of the profile 23, such as user interests, location, and demographic information such as age and gender. Other information can be included in the profile 23. Unlike third party monitoring, which see only separated instances of a user's activity at webpages that these entities can monitor, the proxy servers 12 can analyze all of the user's web browsing activity that the user chooses to conduct through the network 11, thus being able to base the analysis on a more complete picture of the user's browsing activity, resulting in a more reliable user profile 23. However, unlike when a user profile is created by third-party tracking entities, the user can interface with the profile manager 22 through the computing device 14 and edit the information in that user' profile 23, thus controlling what information is stored on the Internetwork 13 and used to deliver content such as advertisements to the user. The user's log-in information, such as username and password, can be stored as part of the user profile 23, and can be used to for allowing the user to log-in to the system 10.

The user profile 23 can be used by the profile manager 22 to obtain advertisements that are of interest to the user without revealing the personal information of the user. Thus, for example, a number of users with a particular interest could be compiled, and the profile manager 22 can provide the number to an entity wanting to place advertisements targeted for that interest. The profile manager 22 receives the advertisements and adds them to the intermediate representation 16 before presenting the reconstructed, sanitized, webpages 16 to the user. The advertisements can be shown at a particular portion of a rendered webpage 16 in accordance with the rules 19.

Figure 2:
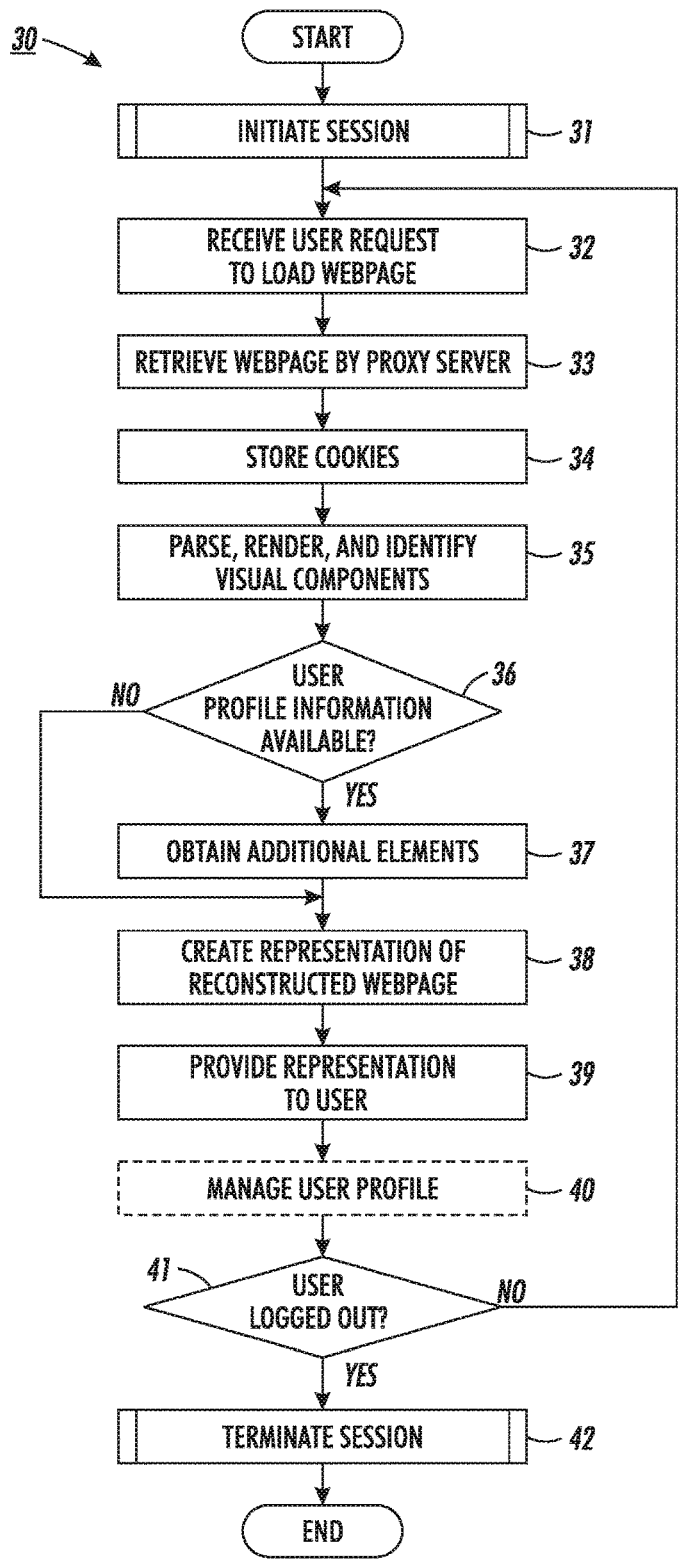
FIG. 2 is a flow diagram showing a method for proxy-based privacy protection in accordance with one embodiment.

As further described below beginning with reference to FIG. 2, the profiles are encrypted using an encryption key, such as a public encryption key, when stored in the database storage 20 and are inaccessible to administrators of the system 10. The profiles are retrieved by one of the proxy servers 12 from the storage 20 when the user starts a session interacting with that proxy server 12. The profile 23 is decrypted using another key, such as a private decryption key, that is stored at the computing device 14 associated with the user, and that the computing device 14 provides to the server 12 to decrypt the profile of the user 22. Following the termination of the user's session with the proxy, the profile 23 is again encrypted by the server 12 and stored at the storage 20.

In one embodiment, the network 11 can be implemented in a cloud-computing environment, such as Amazon Elastic Compute Cloud (EC2®) offered by Amazon.com Inc. of Seattle, Wash., though other implementations are possible.

The at least proxy servers 12, computing device 14, and the load balancers 24 can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the servers can act as a specialized computer. For instance, when the modules are implemented as hardware, that particular hardware is specialized to perform the computations and communication described above and other computers cannot be used. Additionally, when the modules are burned into read-only memory components, the computer storing the read-only memory becomes specialized to perform the operations described above that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components. For example, the proxy servers 12, load balancers 24, and the computing device 14 can include other components found in programmable computing devices, such as input/output ports, network interfaces, and non-volatile storage, although other components are possible.

The use of proxy servers 12 to interact with other parts of the Internet allows to preserve user privacy while learning user data necessary to enrich the user's web-browsing experience. FIG. 2 is a flow diagram showing a method 30 for proxy-based privacy protection in accordance with one embodiment. The method can be implemented on the system 10 of FIG. 1. A computing device 14 associated with a user initiates a session with a network 11 of distributed proxies 12, logging the user into the network 11, as further described with reference to FIG. 3 below (step 31). A user request to retrieve a target webpage 16 is received the load balancer and randomly assigned to one of the proxy servers 12 (step 32). The proxy server 12 accesses the webpage 16 via the Internetwork 13 at the target server 17 (step 33) and stores cookies received from the target server (step 34). The proxy server 12 parses the accessed webpage 16, renders the webpage 16 based on the parsed codes and identifies and recovers visual components of the webpage (step 35) as described above with reference to FIG. 1, thus sanitizing the webpage from elements that enable third party tracking before the webpage is presented to the user. If user profile 23 is available (step 36), additional elements, such as visual components for advertisements, are obtained (step 37). If user profile information is not available (step 36), such as when the user utilizes the network 11 for the first time, the method 30 moves to step 38. An intermediate visual representation 19 of the webpage 16 reconstructed without the tracking elements is created using the sanitized visual components, and if available, additional visual components, in accordance with the rules 19, as further described above with reference to FIG. 1 (step 38). The constructed intermediate representation 19 is provided to the user (step 39). The profile 23 of the user is managed, as further described below with reference to FIG. 3 (step 40). The management of the profile can also be performed at a different point of the method 30; for example, a user could edit the profile before making a request for a target webpage, as further described below with reference to FIG. 3. If the user remains logged into the system 10 (step 41), the method returns to step 32 (step 41). If the user logs out or otherwise indicates a desire to end the session of web-browsing through the network 11 (step 41), the session terminates (step 42), as further described below with reference to FIG. 5, terminating the method 30.

Figure 3:
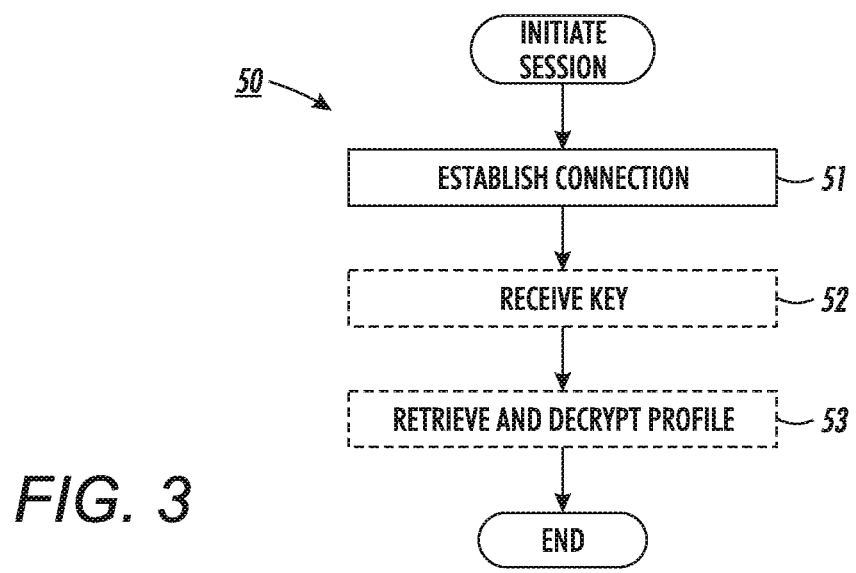
FIG. 3 is a flow diagram showing a routine for initiating a secure web-browsing session for use in the method of FIG. 2 in accordance with one embodiment.

For a secure web-browsing session to begin, several events have to occur. FIG. 3 is a flow diagram 50 showing a routine for initiating a secure web-browsing session for use in the method 30 of FIG. 2 in accordance with one embodiment. A connection is established between the computing device 14 and the load balancer 24 on the distributed network 11 via the Internetwork 13, either through a plug-in in the web-browser of the computing device or by configuring the browser 15 to point at the balancer 24 (step 51). While establishing the connection, the computing device 14 provides authentication information to the proxy server 12, such as a user name and a password, allowing the proxy server 12 to authenticate the user's identity. Upon establishing the connection, optionally, if the user has previously interacted with the system 10, the computing device 14 would provide to either the load balancer or the proxy server 12 to which the request was assigned the private decryption key for decrypting the user profile 23 for that user (step 52). The proxy server 12 would then retrieve the profile 23 of the user and decrypt the profile 23 using the key, making the profile 23 available for modification and use to obtain additional content (step 53), terminating the routine 50.

Figure 4:
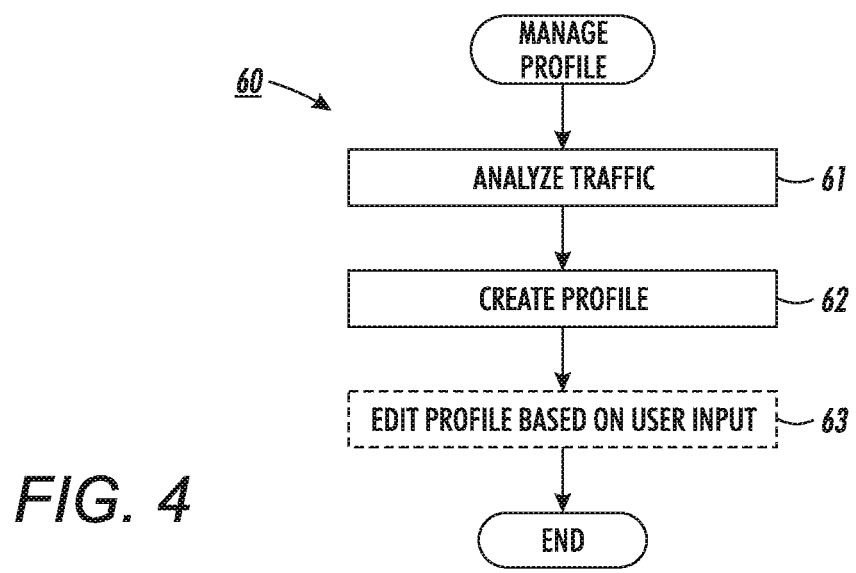
FIG. 4 is a flow diagram showing a routine for managing the user profile in accordance with one embodiment for use in the method of FIG. 2 in accordance with one embodiment.

As mentioned above, the profile as the user 22 can be updated and edited at multiple instances during execution of the method 30, allowing to update the profile as more user traffic becomes available and as the user implements changes to the profile. FIG. 4 is a flow diagram showing a routine 60 for managing the user profile in accordance with one embodiment for use in the method of FIG. 2. A user's web traffic, such as the pages the user requests, the amount of time the user spends on the pages, the searches the user conducts, and the links the user clicks, are analyzed to identify the user's characteristics, such as interests and demographics information (step 61), though still other characteristics are possible. The characteristics are stored as part of the profile 23 of the user (step 62). Optionally, the user can connect to the network 11 and edit the profile 23 of that user, which can include, changing, removing, and adding the characteristics recorded in the profile (step 63), though other types of editing are possible ending the routine 60.

Figure 5:
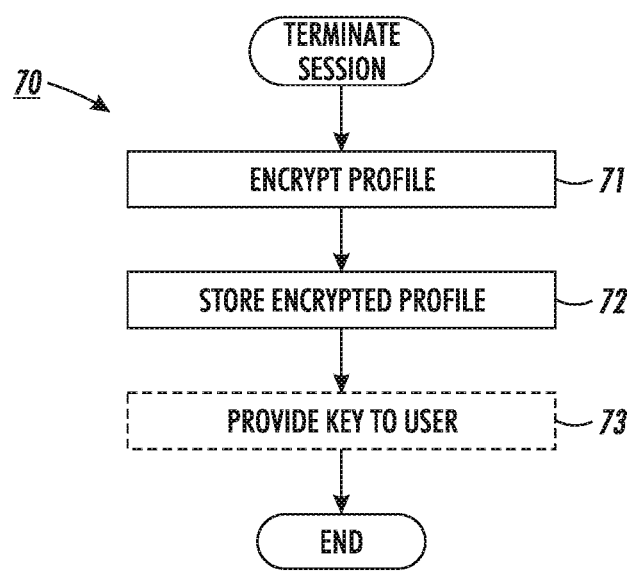
FIG. 5 is a flow diagram showing a routine for terminating a secure web-browsing session for use in the method of FIG. 2 in accordance with one embodiment.

Once the user desires to terminate communications, the information in the user's profile needs to be protected from potential unauthorized use. FIG. 5 is a flow diagram showing a routine 70 for terminating a secure web-browsing session for use in the method 30 of FIG. 2 in accordance with one embodiment. The profile of the user is encrypted by the proxy server 12 using a public encryption key (step 72) and stored by the proxy server 12 in the storage 12 (step 73). Optionally, if the session was the first time the user has utilized the system 10, the proxy server 10 would provide to the computing device 14 the private decryption key that can be utilized during subsequent secure browsing sessions (step 74). The proxy servers 12 does not store the private decryption key, making the user profile inaccessible to administrators of the system 10. The connection to the computing device terminates, ending the routine 70

While the invention has been particularly shown and described as referenced to the embodiments thereof, those skilled in the art will understand that the foregoing and other changes in form and detail may be made therein without departing from the spirit and scope of the invention.

What is claimed is:

1. A system for proxy-based privacy protection, comprising:
    one or more proxy servers, each of the proxy servers comprising a non-transitory computer readable storage medium comprising program code and a computer processor coupled to the storage medium and configured to execute the code to perform steps of:
        receiving from at least one computing device associated with a user one or more requests to provide a webpage stored on at least one target server, wherein the at least one computing device is configured to display to the user a visual rendering of each of the requested webpages;
        for each of the requests, retrieving the requested webpage from the target server;
        for each of the retrieved webpages, parsing the webpage into one or more elements, creating the visual rendering of the webpage based on one or more of the parsed elements, and identifying visual components of the webpage in the visual rendering, the visual components comprising at least one of text and one or more images, that are present in the in the visual rendering when the visual rendering is displayed;
        for each of the parsed webpages, creating using one or more of the visual components identified in the visual rendering for that webpage a representation of a version of the parsed webpage reconstructed without one or more of the visual components identified in the rendering for that webpage;

for each of the representations, providing by one of the proxy servers the representation to the computing device, wherein the computing device displays the reconstructed version of the webpage comprising one or more of the visual components using the representation for that webpage and the displayed reconstructed version differs from the visual representation of the webpage;

analyzing the requested webpages;

deriving one or more characteristics of the user based on the analysis;

creating a profile of the user, the profile comprising the derived characteristics; and storing the profile in a storage interfaced to the proxy servers.

2. A system according to claim 1, further comprising: a load balancer configured to receive each of the requests and to randomly assign each of the requests to the proxy servers.

3. A system according to claim 1, wherein the one or more parsed elements not present in the reconstructed webpage comprise tracking elements.

4. A system according to claim 1, the steps further comprising:
encrypting the user profile prior to storing the user profile;
receiving an decryption key from the computing device; and
decrypting the user profile using the key upon the receipt of the key.

5. A system according to claim 1, the steps further comprising:
editing the user profile based on an input from the user.

6. A system according to claim 1, the steps further comprising:
selecting one or more additional components for one or more of the parsed webpages based on the user profile,
wherein one or more of the representation is further created based on one or more of the additional elements.

7. A system according to claim 6, wherein the additional components comprise advertisements.

8. A system according to claim 1, wherein each of the proxy servers is associated with an Internet Protocol (IP) address different from the IP addresses of the remaining proxy servers.

9. A system according to claim 1, wherein the computing device executes a web-browser comprising a plug-in for connecting to the load balancer.

10. A method for proxy-based privacy protection, comprising:
receiving one or more proxy servers one or more requests from at least one computing device associated with a user to provide a webpage stored on at least one target server, wherein the at least one computing device is configured to display to the user a visual rendering of each of the requested webpages;
for each of the requests, retrieving by one of the proxy servers the requested webpage from the target server;
for each of the retrieved webpages, parsing by one of the proxy servers the webpage into one or more elements, creating the visual rendering the webpage based on one or more of the parsed elements, and identifying visual components of the webpage in the visual rendering, the visual components comprising at least one of text and one or more images, that are present in the visual rendering when the visual rendering is displayed;
for each of the parsed webpages, creating using one or more of the visual components identified in the visual rendering for that webpage by the proxy server a representation of a version of the parsed webpage reconstructed without one or more of the visual components identified in the visual rendering for that webpage;
for each of the representations, providing by one of the proxy servers the representation to the computing device, wherein the computing device displays the reconstructed version of the webpage comprising one or more of the visual components using the representation for that webpage and the displayed reconstructed version differs from the visual representation of the webpage;
analyzing by one or more of the proxy servers the requested webpages;
deriving by one or more of the proxy servers one or more characteristics of the user based on the analysis;
creating by one or more of the proxy servers a profile of the user, the profile comprising the derived characteristics; and
storing by one or more of the proxy servers the profile in a storage interfaced to the proxy servers.

11. A method according to claim 10, wherein each of the requests is received by a load balancer, further comprising:
randomly assigning the requests to the proxy servers by the load balancer.

12. A method according to claim 10, the one or more parsed elements not present in the reconstructed webpage comprise tracking elements.

13. A method according to claim 10, further comprising:
encrypting the user profile prior to storing the user profile;
receiving a decryption key from the computing device; and
decrypting the user profile using the key upon the receipt of the key.

14. A method according to claim 10, further comprising:
editing the user profile based on an input from the user.

15. A method according to claim 10, further comprising:
selecting one or more additional components for one or more of the parsed webpages based on the user profile,
wherein one or more of the representation is further created based on one or more of the additional elements.

16. A method according to claim 15, wherein the additional components comprise advertisements.

17. A method according to claim 10, wherein each of the proxy servers is associated with an Internet Protocol (IP) address different from the IP addresses of the remaining proxy servers.

18. A method according to claim 11, wherein the computing device executes a web-browser comprising a plug-in for connecting to the load balancer.

* * * * *